United States Patent
Zgarba et al.

(10) Patent No.: US 6,502,239 B2
(45) Date of Patent: Dec. 31, 2002

(54) METHOD AND APPARATUS FOR ROUND-TRIP SOFTWARE ENGINEERING

(75) Inventors: Tony Zgarba, Houston, TX (US); Helga Yang, Paoli, PA (US); Dilhar De Silva, Houston, TX (US)

(73) Assignee: Computer Associates Think, Inc, Islandia, NY (US)

( * ) Notice: Subject to any disclaimer, the term of this patent is extended or adjusted under 35 U.S.C. 154(b) by 0 days.

(21) Appl. No.: 09/190,761

(22) Filed: Nov. 12, 1998

(65) Prior Publication Data

US 2002/0170048 A1 Nov. 14, 2002

(51) Int. Cl.[7] .............................................. G06F 9/44
(52) U.S. Cl. ...................................................... 717/168
(58) Field of Search ................... 717/2–5, 11, 120–123, 717/104–109, 168–173; 707/511, 203

(56) References Cited

U.S. PATENT DOCUMENTS

| | | | | |
|---|---|---|---|---|
| 5,249,275 A | * | 9/1993 | Srivastava | 395/375 |
| 5,287,548 A | * | 2/1994 | Flood et al. | 395/375 |
| 5,371,747 A | * | 12/1994 | Brooks et al. | 371/19 |
| 5,675,803 A | * | 10/1997 | Preisler et al. | 395/704 |
| 5,999,938 A | * | 12/1999 | Bliss et al. | 707/102 |
| 6,145,124 A | * | 11/2000 | Price | 717/9 |

OTHER PUBLICATIONS

Breuer. Decompilation: The Enumeration of Types and Grammars. ACM. pp. 6113–1647, Sep. 1994.*

* cited by examiner

Primary Examiner—Gregory Morse
Assistant Examiner—Wei Zhen
(74) Attorney, Agent, or Firm—Cooper & Dunham LLP

(57) ABSTRACT

A method of round-trip engineering source code from a software model, and in particular a method of forward engineering code previously reverse engineered into a software model whereby to generate updated source code without any changes to the code not changed in the model, and without using obtrusive code markers in the source code. Elements from the original source code represented by the model are placed in a meta-model, and compared to a similar meta-model of the software model. Appropriate changes and additions are made in the source code to elements which have been changed in the software model. The rest of the code in the software model remains untouched.

24 Claims, 7 Drawing Sheets

FIG. 3A

```
$PBExportHeader$w_sort.srw
$PBExportComments$Example usings Sort DW Service
forward
global type w_sort from w_main
end type
...
end forward global type w_sort from w_main
int Y=266
int Y=77
int Width=2145
int height=1701
boolean Titlebar=true
string Title="Sort Example"
ddlb_sort_style ddlb_sort_style
dw_tosort dw_tosort
gb_1 gb_1
cb_sort cb_sort
cb_close cb_close
cb_retrieve cb_retrieve
end type global w_sort w_sort type variables end variables
...
```

FIG. 3B

```
$PBExportHeader$w_sort.srw
$PBExportComments$Example usings Sort DW Service
forward
global type w_sort from w_main
end type
...
end forward global type w_sort from w_main
end type global w_sort w_sort type variables
private integer new_attribute    | New information
private boolean sort_state       | From Model
end variables
...
```

```
 5      /* This is a library file */       1
                                            2
                                            3
        class X                             4
        {                                   5
10        int att1;                         6
          Z att2;                           7
          void do This();                   8
        }                                   9
                                           10
15      /*Important comment about Class Y*/ 11
                                           12
        class Y                            13
        {                                  14
          int att3;                        15
20        void doTheOther()                16
        }                                  17
```

FIG. 10

```
1  ──▶ /* This is a library file */
2  ──▶
3  ──▶
4  ──▶ class X
5  ──▶ {
6  ──▶     int att1;
7  ──▶     Z att2;
8  ──▶     void do This();
18 ──▶ }
9  ──▶
10 ──▶ /*Important comment about Class Y*/
11 ──▶
12 ──▶ class Y
13 ──▶ {
14 ──▶     int att3;*/
15 ──▶     void do TheOther()
16 ──▶ }
17 ──▶ void do That();
```

FIG. 11

```
    * This is a library file */

5
    class X
    {
        int att1;
        Z att2;
10      void do This();
        void do That();
    }

/*Important comment about Class Y*/
15
    class Y
    {
        /*int att3;*/
        void do TheOther()
20  }
```

METHOD AND APPARATUS FOR ROUND-TRIP SOFTWARE ENGINEERING

BACKGROUND OF THE INVENTION

The present invention relates to software design modeling, and in particular to round-trip software engineering in which a software application is reverse engineered into a software model, the software model can be changed, and the code represented by the software model can then be re-coded.

Due to inadequate software design modeling, application development projects have typically been very difficult to deliver with any kind of consistent success. A very low percentage of significant application development projects are completed on time and within budget. As projects have grown larger in scope, organizations have begun to partition applications and corresponding subsystems into multiple tiers, with each tier being developed and maintained independently of the others. This enables applications to scale up to the enterprise level. As more complex $3^{rd}$ generation language projects are developed, a corresponding need for formal analysis and design modeling has increased. Accordingly, in order to combine various disjoint applications into a single large scale solution, existing applications need to be visualized and understood, without recourse to digging through the source code. Furthermore, projects need to be re-engineered using component-based development techniques to take advantage of various emerging object technologies such as CORBA, Microsoft ActiveX (OCX) and the World Wide Web.

The first step required involves adding object-oriented analysis and design to the existing development process. As software needs become increasingly complex, an environment is needed to complement the third generation lifecycle with an object-oriented analysis and design front end, enabling the application writer to take advantage of reusable components and track the development of the project. Many modeling products have been developed for this purpose, such as Platinum Technology, Inc.'s Paradigm Plus. The challenge in such products is to keep the design information synchronized with the code.

As represented in FIG. 1, the capability is required to keep a software model 2 up to date with changing source code 4, allowing the generation of easily understood diagrammatic representations of the software design. This capability has been included in most, if not all, object modeling tools. Without this feature, a software model must be manually updated whenever changes are made in the design as the source code is written. This often leads to forgotten updates to the software model and a software model that is out of date with respect to the source code that it is intended to represent.

As shown in the Venn Diagram in FIG. 2, the problem is exacerbated by the fact that the software model generally only represents a subset of the information represented in the source code, and a large amount of meta-data concerning the project which is stored in the software model is not represented in the source code. For example, neither comments in the source code nor properties of objects relating to their formatting will generally be incorporated in the software model. Design principles and relationships between objects in the modeling methodology being used which are represented in the software model, will not be included explicitly in the source code.

Several tools in the industry have added a round-trip engineering technology which can read the source code and synchronize the software model with the source code. However, these tools rely on being able to place markers into the source code 4 to define areas of the code which correspond to the software model 2. These markers clutter the source code with extraneous marks, causing readability problems. In addition, this technique is prone to error when one of the markers is deleted or inadvertently edited by the developer.

What is required is a method of round-trip engineering allowing a software model to be kept synchronized with corresponding source code or equivalent objects, without the need for code markers cluttering up the code.

STATEMENT OF INVENTION

The present invention provides a system for keeping a software model representing a software application in synchronization with the source code it represents without the need for any kind of source code markers delimiting parts of the code which are to be synchronized with the software model. The code in the software application is analyzed, and a software model of the aspects of the application which can be incorporated in the software model is generated. The software model is then used to regenerate the source code represented by the software model, and any of the source code which is not represented in the software model is merged into the generated source code from the original code.

These and other objects of the invention will be apparent from the remaining portion of this specification.

BRIEF DESCRIPTION OF THE DRAWINGS

FIG. 3A shows an exported PowerBuilder object by way of example.

FIG. 3B shows the PowerBuilder object of FIG. 3B once it has been reverse engineered and forward engineered in accordance with bi-directional engineering techniques known prior to the present invention.

FIG. 10 showing preliminary merge code

FIG. 11 showing final merge code

DETAILED DESCRIPTION

Figure 1:
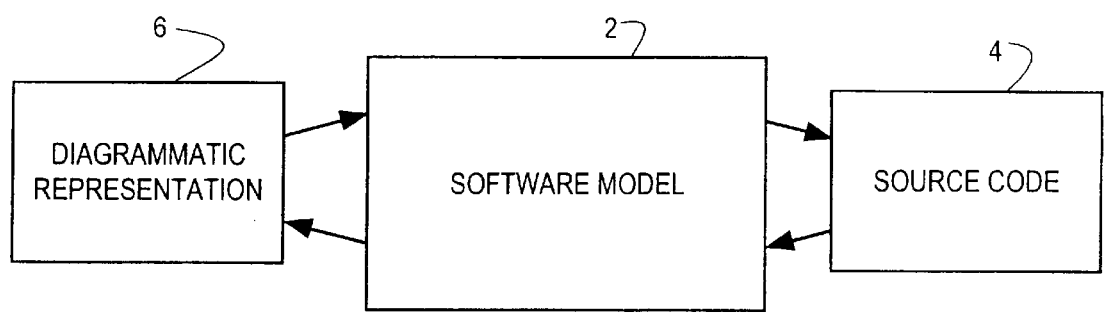
FIG. 1 is a diagram showing an overview of the requirements of a round-trip engineering tool.

As shown in FIG. 1, the embodiment of the invention hereinafter described relates to round-trip engineering of a software project between a software model 2 and the project source code 4, whereby the software model and the software can be kept synchronized.

The primary example used to clarify the operation of the embodiment and represented in FIGS. 5–11 Is based around the C++ programming language, although there is no reason the invention could not operate on other object oriented languages or other types of languages, as will become apparent. Languages in which the objects are normally stored in proprietary binary formats can often be exported into flat file formats, such as ASCII Text Files with representations of all the features of the objects, so that the objects can be re-imported back into the application. Examples of such applications are Microsoft's Visual BASIC, Visual C++, Access and Sybase PowerBuilder. Often, certain modules in these applications will be stored as flat source code files anyway, such a s C++.cpp files and BASIC bas files.

The software model 2 does not need to provide all the concepts of the language of the source code, and will normally provide modeling for the higher level concepts in the source code. such as classes, attributes, operation/methods etc., or data flow modeling between components. Many aspects of the source code, such as formatting of objects therein will often not be stored in the software model, but it is very important that such information is not lost in round-trip engineering. For example, code exported from a Sybase. PowerBuilder application shown in FIG. 3A includes information concerning the width, height and position of a window type class w_sort. Such information generally would not be included in a software model. If this code were reverse engineered into a software model 2, and then recreating using the software model per se, the code generated might have the appearance of the code shown in FIG. 3B with much of the formatting information being lost in the round-trip.

Furthermore, the language in which the software model 2 is generated will ideally be able to model various software development languages and therefore it is unlikely that any particular language being modeled will support all the concepts supported by the modeling language.

Figure 2:
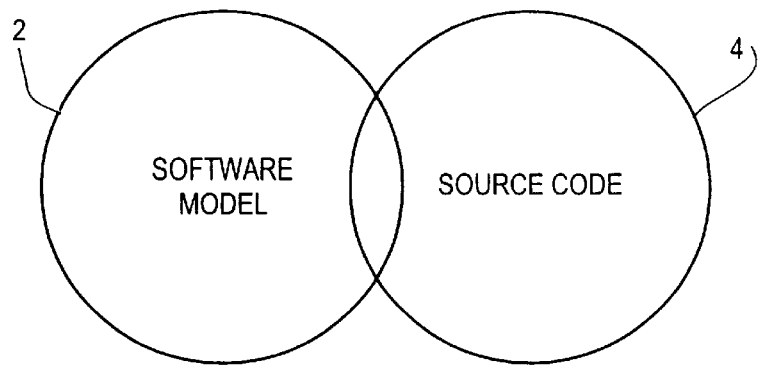
FIG. 2 is a Venn Diagram representing the information stored in the source code for a project and a software model of the same project.

Accordingly, a situation exemplified by the Venn Diagram in FIG. 2 arises, with the software model and the software development language sharing common concepts, but each having concepts not provided by the other.

For example, if the source code language were C++, the software model might provide for the modeling of C++ classes, structs, unions and enumeration classes with similar structures, although enumeration classes might be considered as a data type rather than a class in the software model. C++ attributes could be mapped onto software model attributes, associations and/or aggregations depending on options passed to the reverse engineering utility and code situations. Additional information, such as "static" or "const" might be marked in the operations' properties accordingly. Global methods might be mapped to global operations in the modeling language. C++ methods might be modeled as operations in the modeling language, and overloaded methods could be given an integer ID concatenated to their name to uniquely identify them in the software model.

Many software modeling products, such as Platinum Technology, Inc.'s Paradigm Plus are currently available which permit generation of software models from source code using various different modeling methodologies, and also permit the generation of source code from the software model. The following description of the operation of the invention assumes that the necessary functionality is already in place to generate such software models and regenerate source code from these software models and accordingly does not address the actual representation of the software model, except by way of example.

The source code 4 of a software project, which will generally consist of a set of files stored on a computer or a network or computers. The present invention provides a method for round-trip engineering of source code using an implementing an improved system for forward engineering.

As stated above, standard techniques are used to generate a software model, or to augment a software model 2 already generated. The software model can then be forward engineered to generate source code for the project as shown. Importantly, when a software project is reverse engineered from source code, and the software model generated is forward engineered, the resultant code should be essentially the same, regardless of what information in the source code is represented in the software model. This allows for proper "round-trip" engineering of the software project, so that the software model and the source code can be kept synchronized, updates in both the source code and the software model will be maintained when generating the source code from the software model and vice versa, and comments and other features of the source code not represented in the software model do not get moved around or even disappear in the round-trip process.

Figures 4, 5:
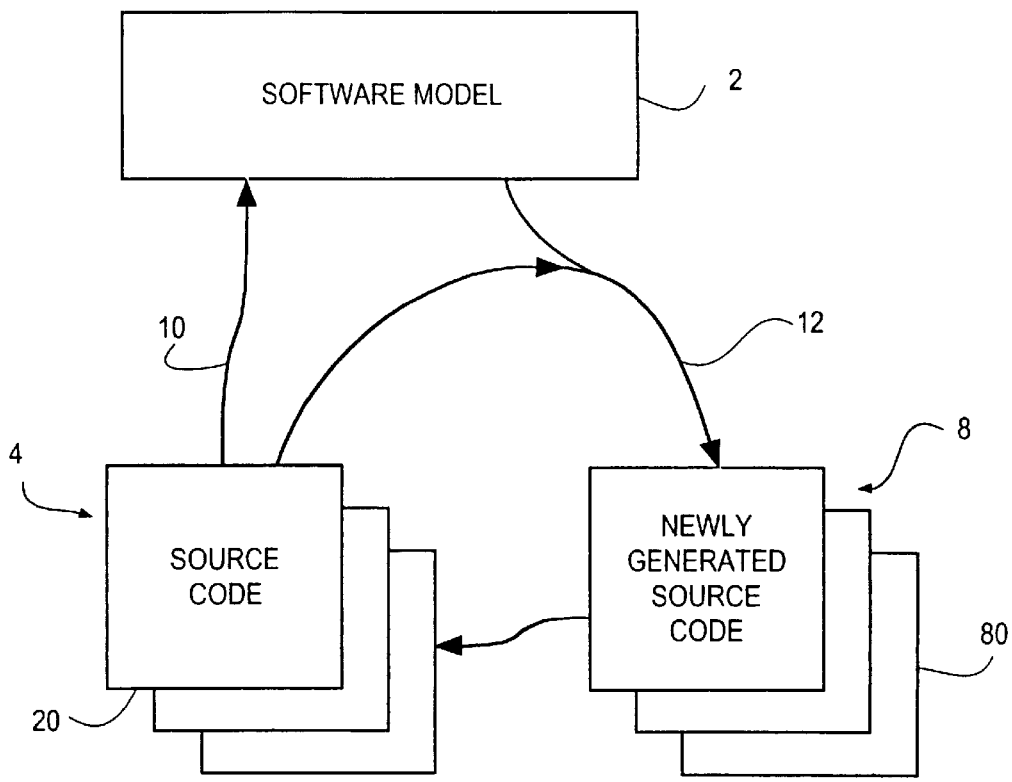
FIG. 4 shows an overview of a round-trip engineering process in accordance with a first embodiment of the invention.
FIG. 5 shows sample C++ source code by way of example.
Figure 6:
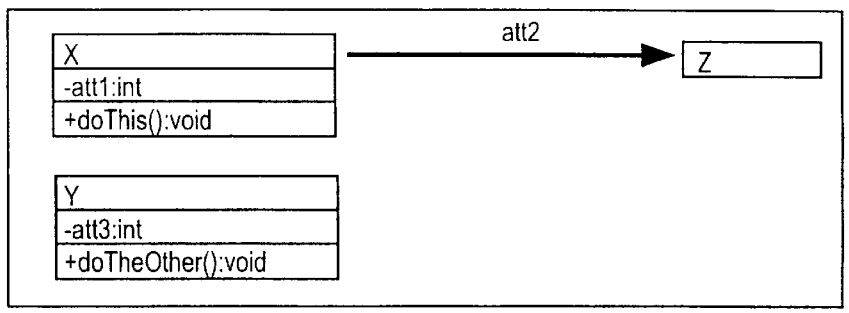
FIG. 6 shows a meta-model generated from the source code shown in FIG. 5.

The operation of the round-trip engineering of the specific embodiment of the invention described is shown in broad terms in FIG. 4.

Reverse engineering 10 is carried out in a normal manner, but importantly, during forward engineering 12, the existing source code 4 is merged with the data from the software model 2 whereby to generate new source code 8 which then replaces the existing source code. Corresponding sections of the source code are identified for each element in the software model 2, and any changes, additions or deletions that have been made in the software model and which do not correspond to the source code are incorporated in the new source code 8, without affecting any parts of the source code not represented by the software model.

The operation of the specific embodiment of the invention is hereinafter described with reference to FIGS. 5–11. The invention relates to forward, reverse and round-trip engineering from any software language to a software model representing the software. An example of the operation of the embodiment is given with reference to the C++ programming language, although the embodiment is equally applicable to other programming language, and ideally would be able to handle multiple programming languages. The invention is in no way limited to the constructs used by the C++ programming language. The invention primarily relates to the merging of the source code and the data in the software model, where possible retaining the original source code without recourse to markers in the code. The actual contents of the code are not relevant to the invention.

Source code 4 in source code files 20, written in a particular programming language are reverse engineered into a new software model 2 or incorporated into an existing software model 2, and then forward engineered from the software model 2 into a new set of source code files 80, or merged with existing source code files 20 without recourse to new source code files.

Reverse Engineering

Reverse engineering according to this embodiment is effected by parsing the code and transforming all the elements of the code which can be represented by the software model into a generic meta-model, for example using the CASE Data Interchange Format (CDIF) which is commonly used as a generic standard representation format for software entities. Details of the CDIF set of standards can be obtained from the Electronic Industries Association CDIF Technical Committee. From the generic meta-model, the elements of the code which can be represented in the software model selected are exported into the software model. The method of exporting the data from the meta-model to the software model will depend on the format of the software model and meta-model generated, but in most cases will simply involve populating a database 30 of elements. The software model 2 of this embodiment of the invention uses a database comprising tables 22, 23, 24, 25 to represent the data.

Figure 7:
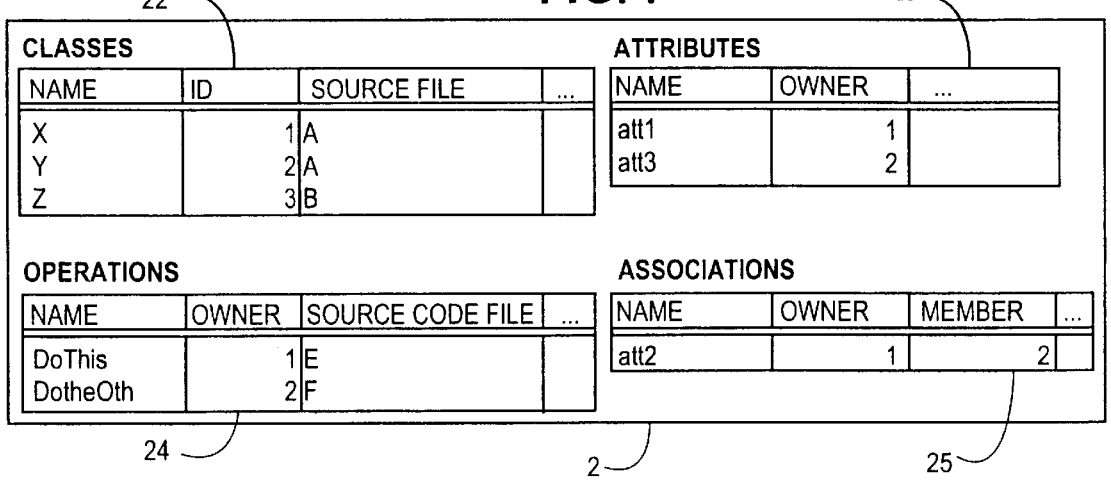
FIG. 7 shows tables in a database representing a software model.

The software model 2 need not be in database format, and might be stored in any kind of data structure. In the database shown in FIG. 7, different elements of the application are classified by type into tables 22, 23, 24, 25 with appropriate fields to represent all the properties of the elements, and cross reference them to other associated elements appropriately. The format of these tables will vary depending primarily on the methodology embodied by the software model to represent the software being modeled. For example, the software model shown in FIG. 7 represents classes, attributes, operations, associations, the relationships therebetween and other features thereof. These constructs can be used to represent constructs in many object oriented languages. For example, C++ methods can be represented as operations in the software model, and C++ constructs of the types CLASS, STRUCT, UNION and ENUM can all be represented as classes in the software model. The software model might also hold information relating to other software entities such as objects or data flow between entities. Four tables are shown in FIG. 7, each holding information relating to classes, attributes, operations and associations. The two classes X and Y in the Classes table 22 are given integer identifiers which the software model uses to identify them. Other features of the classes are also stored in the table, such as the source file of the class in question, and the type of the class in question, such as CLASS or STRUCT. Certain of the fields provided by the software model for each of the classes might be inapplicable to the software language being modeled, and can be left empty.

Each entry in the attributes table 23 has a field representing the name of the attribute, and the owning class. Other fields might be the scope of the attribute, the type, and the source file. As attributes might be overloaded, ie. different attributes in different classes sharing the same name, the name given to the attribute in the software model might need to be modified to distinguish between commonly named attributes and an alias given for the attribute in question. Alternatively, attributes could be given arbitrary identifiers as key values in the table, so that more than one attribute could share the same name. The same principle would be used for other constructs which could be overloaded, such as operations.

Records in the operations table 24 contains operations, which in this example would hold C++ methods and functions. These records likewise have fields for the owning class, if there is one. In this example based around C++, a source file field in this table would refer to the actual file containing the source code for the method, rather than the source file containing the declaration of the method, as the latter could be derived from the source file of the owning class.

Finally, the associations table 25 contains associations between classes. In this example, attributes which are of a class type are stored as associations, although they could be stored in the attributes table with the type set to the class name. The owning class field stores the class in which the attribute is defined, and via which it is accessed. The member class stores the class of which the attribute is a type, that is to say, the class type of the attribute.

Figure 12:
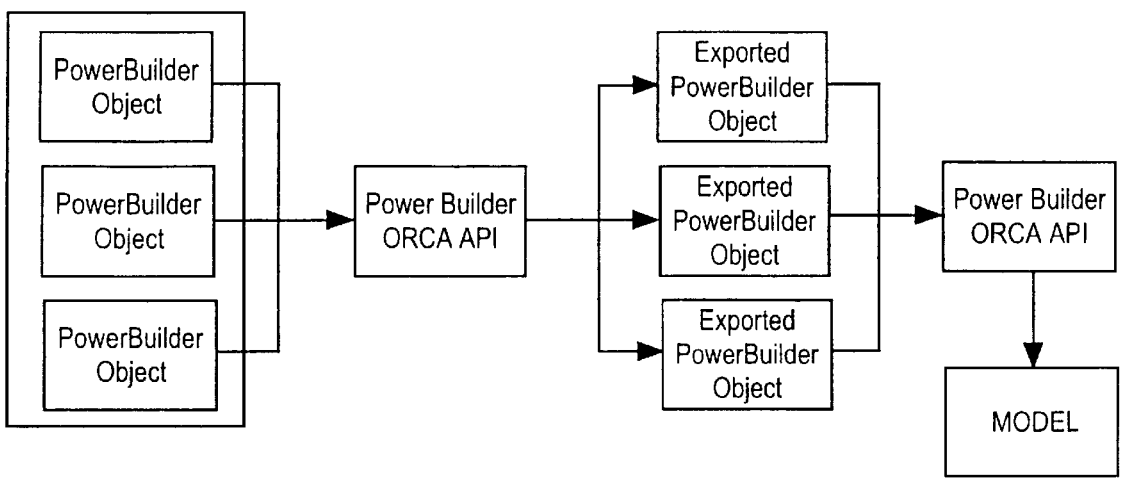
FIG. 12 showing overview of reverse engineering (PowerBuilder)

Reverse engineering of object based languages, rather than source code can be achieved by exporting all the information encapsulated in the objects into a flat file format, for example ASCII, and then importing any information which can be represented by the software model 2 from the exported file into the CDIF meta-model and from there imported into the software model. The step of representing the data in the CDIF format could be avoided. However, using the intermediate step of generating a CDIF format file has the advantage that standard utilities which are already in existence for transforming data from various source languages into CDIF Format can be used, and a single utility can then be used to import the data from CDIF format into the software model. If the software model were to be generated directly from the source code, a different utility would need to be generated for each source language supported by any particular software model format. FIG. 12 shows a an example of the operation of reverse engineering according to the invention on a set of PowerBuilder objects. If the invention were operating on C++ source code, the exporting step would not be necessary, and the code could be transformed directly into CDIF Format.

If a software model 2 is already present when the data from the source file is imported into the software model, and data from the source file is to be merged into the software model rather than replacing it, a check is made before adding elements into the database for corresponding elements already in the database. If a corresponding element is not found, the element is simply added to the database.

If a corresponding element is found in the database and the data fields which are defined in both the element to be merged and the corresponding element already in the table match, any data fields defined only in the element being imported are incorporated in the existing fields for the corresponding elements and the other fields are left untouched.

If a corresponding element is found in the database and the data fields which are defined in both the element to be merged and the corresponding element already in the table do not match, contention handling is used to ascertain whether the imported element or the element already in existence will have priority. For example, a message box could be displayed reporting the contention and asking which data should be used in the software model. Which of the imported data and the data already present has priority could also be preset before the import commences so that no contention resolution is necessary.

Furthermore, a check could also be made that all the data in the software model associated with the source file or source files being imported were actually among the elements imported. Any mismatch would correspond either to elements added to the software model or elements removed from the source code since the software model and the source code were last synchronized. If logging of additions to the software model are made, a simple check of the logged additions would allow the importing utility to ascertain whether the element had been added to the software model or removed from the source code and take appropriate action. In the latter case, a message box could be provided asking if the element should be removed from the software model.

Forward Engeneering

Figure 8:
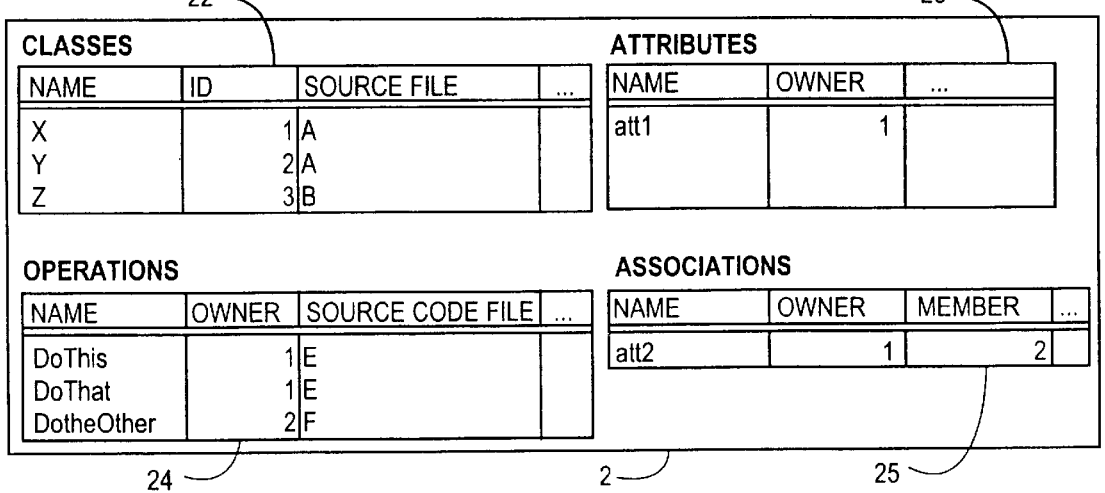
FIG. 8 shows modified tables in a database representing a software model.
Figure 13:
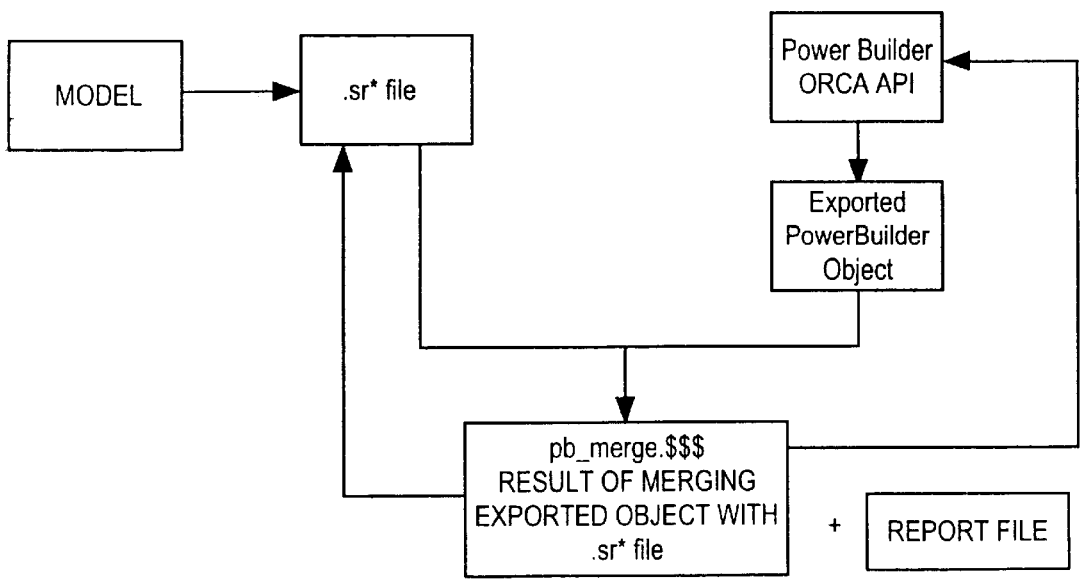
FIG. 13 showing overview of forward engineering

Forward engineering is effected by merging the data in the software model 2 with any existing source code 4, adding new code, changing code or removing code when necessary to create new source code 8. Importantly, existing source code not affected by changes in the software model is left unchanged. An example of the forward engineering process which could be used to generate a PowerBuilder project, after reverse engineering in accordance with FIG. 12, is shown in FIG. 13. The Forward Engineering process will generally be used to modify source code based on modifications to the software model, or to create new source code. The present invention provides a system for doing the former, and the process is explained with reference to FIGS. 8 to 11 wherein FIG. 8 shows a software model 2 being a modified version of the software model shown in FIG. 7.

As mentioned already, fields in the software model 2 might not be transferrable into the source code. For example, a field might be provided in the representation of a class in the software model identifying a document containing an explanation of the function of the class in question. Such fields can be populated in the software model to aid in the software design without being incorporated into the source code, and, as discussed above, will not be affected by reverse engineering of the source code because corresponding data which might cause a contention would never be imported from the source code.

Figure 9A:
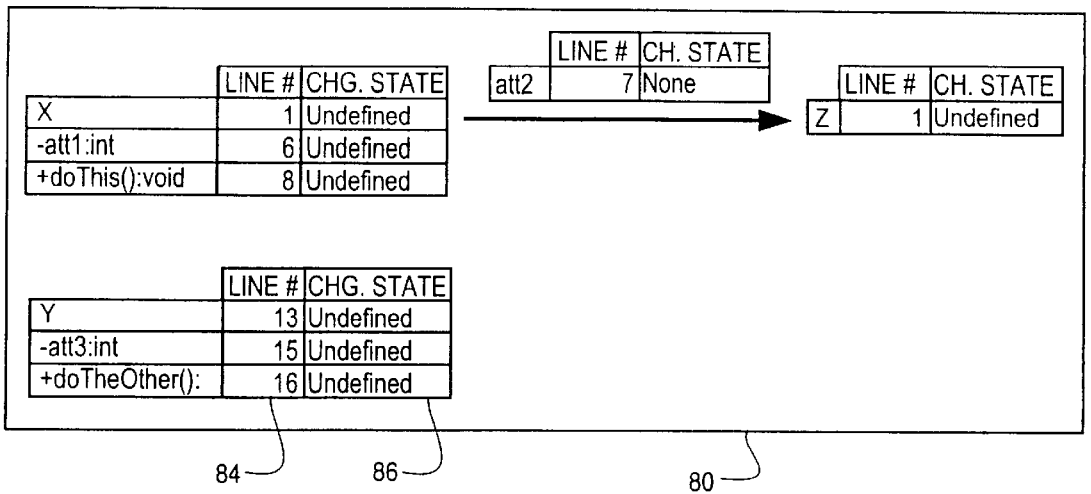
FIG. 9A shows a meta-model generated from the for source code shown in FIG. 5.
Figure 9B:
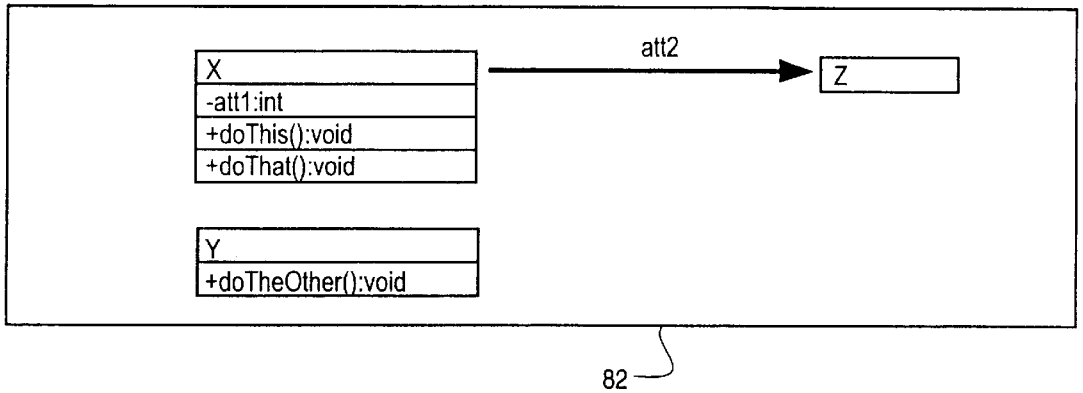
FIG. 9B shows a meta-model generated from the software model shown in FIG. 8.

Returning to FIGS. 9A and 9B, when performing forward engineering of a source code file, a generic meta-model 80 of the data in the source file or files being forward engineered, and a generic meta-model 82 of the data in the software model are first generated. Meta-models which might be generated from the modified software model shown in FIG. 8 and the original source code shown in FIG. 5 are shown in FIGS. 9A and 9B respectively. The meta-models might for example be generated in CDIF format, as discussed above with reference to the reverse engineering process. The generic meta-model format used must permit representation of all the elements of the source-code that can be represented in the software model and vice-versa. The use of the generic meta-model makes it possible to compare the two different data sources. Mappings from each specific environment to the generic meta-model are developed to ensure that no data is lost and the appropriate information is compared. Furthermore, only the elements from the software model which should be present in the source-code file being forward engineered are extracted. For example, all the classes stored in the software model 2 with their source-code file field corresponding to the source-code file will be brought into the meta-model 82, and all the attributes, operations and associations owned by those classes. Classes and other objects from source-code files other than the source-code file being generated are not placed in the meta-model. For example, as shown in FIG. 9A, Class Z is not put in the meta-model, as it does not form part of source-code file A (see FIG. 8). If more than one source file is to be generated in the forward engineering process, the method described for forward engineering will be carried out for each source file and the appropriate data extracted form the software model 2 in each case.

The operation of the meta-model generation and the nature of the meta-models generated will depend on the structure of the programming language and the constructs therein, as well as the constructs used in the software model. It must be possible to search through the elements in the source-code meta-model 80 and identify corresponding elements from the software model 2 and the source code 4. For example, different classes, variables and other independent structures in the source code such as STRUCT and UNION structures could be stored in a linked list. Elements owned by these structures could be placed in a linked list pointed to by the appropriate element in the main linked list. Searching for elements is then easily accomplished by passing down the linked list, finding the appropriate elements, and if necessary then looking through the appended linked list associated with that element.

Importantly, each element in the generic meta-model generated from the source code has associated with it a line number 84 and a "change state" 86. The line number corresponds to the line number of the element in question in the original source code. In alternative embodiments of the invention, the actual start and finish points in the code associated with any particular element could be stored in the software model, rather than just the line number, so that multiple elements on one line can be independently merged. For example, in the example meta-model generated from the source code shown in FIG. 9A, the line numbers 84 are shown in the center column.

The change state 86 is shown in the right column for each of the elements in FIG. 9A. It can have one of four values: Added, Deleted, Modified and None. Initially, when the meta-model is generated, the elements will all have an undefined change state, to represent that the merge has not yet commenced, and no changes have been made to the meta-model, as shown in FIG. 9A.

The meta-model 82 generated for the software model 2 does not require the line numbers 84 and change states 86 as will become apparent. A representation of a meta-model generated for the software model 2 is shown in FIG. 9B.

A search is made over the generic meta-model 80 of the source code 4 for a corresponding element to each element in the meta-model 82 for the software model 2.

If a corresponding element is not found, the element is added to the meta-model for the source code, and the element's "ChangeState" is set to "Added".

If the element is found but there is a parameter mismatch, the parameters are changed to the updated parameters., and the change state of the corresponding element is set to "Modified". A representation of the replaced parameters would be stored in a file, or in the meta-model so that an appropriate log can be made at the end of the Forward Engineering Process.

If the element is found, and the parameters of the element match, the change state is set to "None" to reflect that there are no changes.

Once all the elements have been searched for, any elements that have not had their change state set must have been removed from the software model. These elements have their change state set to "Deleted". The Change States of all the elements could initially be set to "Deleted" before the search instead of being left empty to avoid passing through all the elements a second time.

To avoid having to generate the second generic meta-model 82, the elements in the meta-model format generated from the software model 2 could instead be compared with the meta-model 80 as they are generated As each element is compared, the same actions described above would be carried out to set the change states, resulting in the same merged meta-model.

It should be noted that it is assumed in the above processing that the software model is assumed to be the correct version and the source code is assumed to be out of date. However, the two could be synchronized if updates to the source code and the software model were previously logged, and the information in the log used to decide which of two corresponding elements in the two meta-models had priority when the software model and the source code do not agree. Reverse engineering would then have to be performed to bring the software model into line with the new source code generated. This would effectively be the opposite round-trip engineering, starting with Forward Engineering. It is generally simpler to the round-trip engineering in the conventional order and the associated merging procedure with the software model having priority is therefore the procedure dealt with herein in detail.

Figure 9C:
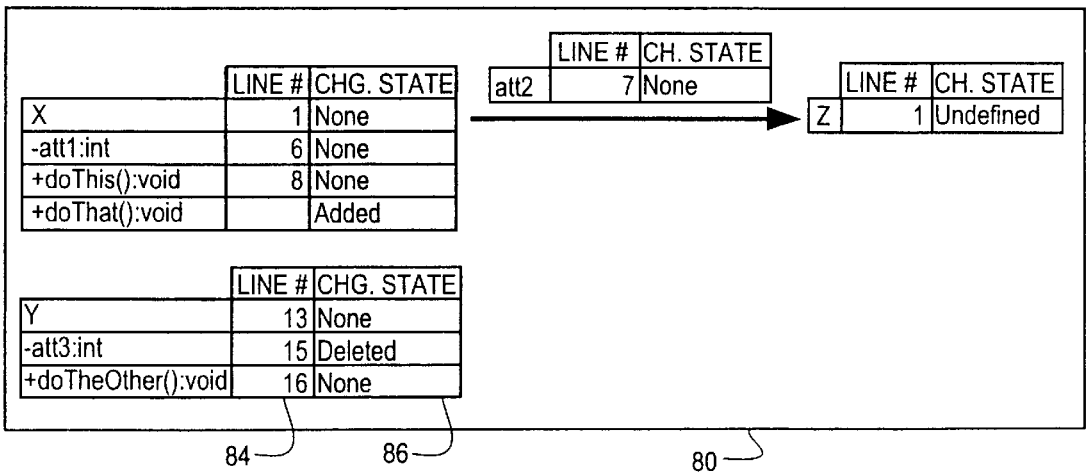
FIG. 9C shows an updated meta-model based on the meta-models in FIGS. 9A and 9B.

The updated meta-model 88 resulting from this process is shown in FIG. 9C with the operation doThat ( ) added and the attribute 3 deleted from the source-code meta-model.

A new version of the source code file is then generated from the original source code file shown in FIG. 5 and the generic-meta model. The new version could be constructed in a file, in a one-dimensional text array with an entry for each line of code, or by placing the source code in a linked list with one entry for each line of code. Two essentially different approaches could be used for inserting new lines of code into the source code. The new source code could be added to the end, and appropriate mappings generated from an index, or the lower part of the data structure in question could be shifted down expanded and the new code slotted in. This would generally be easier if the construction was taking place in a linked list or an array. It is assumed in this example that new code is added to the end of a file, and an index of positions in the file for each line of code updated appropriately, as shown in FIG. 10. The following procedure is then carried out for each elements in the generic-meta model of the code:

If the change state is None, nothing is done to the associated source code.

If the change state is "Deleted", the appropriate line is found in the new source code file using the index, and the line is removed using syntax specific comments (i.e. commented out). For example, in C++, this would involve using comments /* and */ at the beginning and end of the line. Alternatively, the code could actually be removed, and the removed text could be recorded in a log file. In this case, the index position for the line removed would be deleted, and all the other index locations below it moved up by one.

If the change state is "Added", the appropriate place to add the new code is established. For example, if the new element is a member of a class, the last line in the class is found by scanning through all the elements in the class and adding 1 to the highest line number found. Alternatively, the end of the class could actually be included in the generic meta-model with the class element in question, along with the first line number in the class, or a scan of the actual source code could be made to find the last line in the class. A new line or new lines are added to the end of the source code and appropriate code for the element is entered therein. The appropriate point relative to the last line in the class in the original source code is found in the index, and references to the new lines of code inserted. All the index entries below this point are moved down appropriately. The result of this operation inserting the method doThat() is shown in FIG. 10.

If the change state is "changed", the appropriate index entry is found for the line, and appropriate changes made to the code.

Once all the necessary changes and additions have been made, a pass is made through the index and the corresponding lines of code from the merged source code file or data structure representative thereof are extracted and written to a new file in the correct order as shown in FIG. 11. The original source code file is then replaced by the new source code file.

The generated code will be identical to the original code except where changes have been made in the software model.

In a modification of this embodiment, preliminary source code is generated from the source-code, and the source-code thus generated is merged with the original source code. The merging of the two sets of source code could be accomplished by generating a meta-model as described above for both the original and the generated set of source-code. In this case, the meta-model for the generated source-code would correspond precisely with the meta-model 82 for the software model, and the procedure would carry on exactly as described above. In effect, an extra step of converting to source code would have been inserted in the generation of the software model meta-model 82 from the software model 2.

Alternatively, the step of converting both sets of source code into a meta-model could be eliminated, and a utility could parse through both sets of source looking for corresponding elements and updating the original source-code appropriately. The operation of this utility would be similar to the operation of the system for comparing the two meta-models described above, but would require tracking which class or structure the code being scanned through forms a part of. However, it would generally be much simpler to create a meta-model representing the code in a data structure than actually trying to analyze the code on the fly, and this method of merging the software model and the source-code is not considered to be preferable.

While preferred embodiments of the present invention have been illustrated and described, it will be understood by those of ordinary skill in the art that changes and modifications can be made without departure from the invention in its broader aspects. Various features of the present invention are set forth in the following claims.

What is claimed is:

1. A method of synchronizing a software model and existing source code by generating updated source code, said existing source code comprising elements which can be represented in said software model and elements which cannot be represented in said software model, said software model allowing graphical representation of the intercommunication between said representable elements of said existing source code; said method comprising:

a) comparing representations of each software model element with a corresponding element, if any, in the existing source code;

b) generating new source code for each said software model element if said software model element differs from its corresponding element in the existing source code because said software model element has been updated in the software model; and c) incorporating said new source code into said existing source code; and d) storing the combined new source code and the remaining existing source code on a storage medium.

2. A method in accordance with claim 1 said step of comparing representations comprises:

1) generating a first set of elements representing elements of said existing source code in a first intermediate model using an intermediate model architecture, said first intermediate model being able to represent said elements which can be represented in said software model, said representation of each element in the first intermediate model including a reference to the location in the existing source code of the corresponding element;

2) generating comparison elements representing elements of said software model in said intermediate model architecture; and
3) comparing each of said comparison elements to said elements in said first intermediate model;

and wherein said step of generating comprises
generating new source code for each of said elements in said first intermediate model if said corresponding comparison element differs therefrom.

3. A method in accordance with claim 2 wherein an element is added to said first set of elements corresponding to said comparison element if said comparison element is not found in said first set of elements, and wherein said added element in said intermediate model is incorporated at an appropriate place in said updated source code when generating said updated source code.

4. A method according to claim 1 wherein deleted source code elements for which no corresponding software model elements are found are removed from the existing source code.

5. A method according to claim 4 wherein said deleted source code elements are removed by converting said deleted source code elements into source code comments.

6. A method according to claim 1 wherein said source code elements each represent the contents of a line of said existing source code.

7. A method according to claim 1 wherein said source code elements each represent a single entity in said existing source code.

8. A method according to claim 1 wherein the steps of comparing, generating and incorporating are preceded by the steps of generating an original software model from said existing source code and updating elements in said original software model to generate said software model.

9. Apparatus for synchronizing a software model and existing source code by generating updated source code, said existing source code comprising elements which can be represented in said software model and elements which cannot be represented in said software model, said software model allowing graphical representation of the intercommunication between said representable elements of said existing source code; said apparatus comprising:
   a) means for comparing representations of each software model element with a corresponding element, if any, in the existing source code;
   b) means for generating new source code for each said software model element if said software model element differs from its corresponding element in the existing source code because said software model element has been updated in the software model; and
   c) means for incorporating said new source code into said existing source code; and
   d) means for storing the combined new source code and the remaining existing source code.

10. Apparatus according to claim 9 wherein said means for comparing representations comprises:
   1) means for generating a first set of elements representing elements of said existing source code in a first intermediate model using an intermediate model architecture, said first intermediate model being able to represent said elements which can be represented in said software model, said representation of each element in the first intermediate model including a reference to the location in the existing source code of the corresponding element;
   2) means for generating comparison elements representing elements of said software model in said intermediate model architecture; and
   3) means for comparing each of said comparison elements to said elements in said first intermediate model;

and wherein said means for generating comprises
means for generating new source code for each of said elements in said first intermediate model if said corresponding comparison element differs therefrom.

11. Apparatus in accordance with claim 10 comprising means for adding an element to said first set of elements corresponding to said comparison element if said comparison element is not found in said first set of elements, and means for incorporating said added element in said model at an appropriate place in said updated source code when generating said updated source code.

12. Apparatus according to claim 9 further comprising means for removing deleted source code elements from the existing source code for which no corresponding software model elements are found.

13. Apparatus according to claim 12 wherein said removing means removes said deleted source code elements by converting said deleted source code elements into source code comments.

14. Apparatus according to claim 9 wherein said source code elements each represent the contents of a line of said existing source code.

15. Apparatus according to claim 9 wherein said source code elements each represent a single entity in said existing source code.

16. Apparatus according to claim 9 further comprising means for generating an original software model from said existing source code and allowing the updating of elements in said original software model to generate said software model.

17. A computer recording medium including computer executable code for synchronizing a software model and existing source code by generating updated source code, said existing source code comprising elements which can be represented in said software model and elements which cannot be represented in said software model, said software model allowing graphical representation of the intercommunication between said representable elements of said existing source code; said computer recording medium comprising:
   a) code for comparing representations of each software model element with a corresponding element, if any, in the existing source code;
   b) code for generating new source code for each said software model element if said software model element differs from its corresponding element in the existing source code because said software model element has been updated in the software model; and
   c) code for incorporating said new source code into said existing source code; and
   d) code for storing the combined new source code and the remaining existing source code.

18. The computer recording medium according to claim 17 wherein said code for comparing representations comprises:
   1) code for generating a first set of elements representing elements of said existing source code in a first intermediate model using an intermediate model architecture, said first intermediate model being able to represent said elements which can be represented in said software model, said representation of each element in the first intermediate model including a reference to the location in the existing source code of the corresponding element;

2) code for generating comparison elements representing elements of said software model in said intermediate model architecture; and 3) code for comparing each of said comparison elements to said elements in said first intermediate model;

and wherein said code for generating comprises code for generating new source code for each of said elements in said first intermediate model if said corresponding comparison element differs therefrom.

19. The computer recording medium according to claim 18 further comprising code for adding an element to said first set of elements corresponding to said comparison clement if said comparison element is not found in said first set of elements, and code for incorporating said added element in said model at an appropriate place in said updated source code when generating said updated source code.

20. The computer recording medium according to claim 17 further comprising code for removing deleted source code elements from the existing source code for which no corresponding software model elements are found.

21. The computer recording medium according to claim 20 wherein said code for removing removes said deleted source code elements by converting said deleted source code elements into source code comments.

22. The computer recording medium according to claim 17 wherein said source code elements each represent the contents of a line of said existing source code.

23. The computer recording medium according to claim 17 wherein said source code elements each represent a single entity in said existing source code.

24. The computer recording medium according to claim 17 further comprising code for generating an original software model from said existing source code and allowing the updating of elements in said original software model to generate said software model.

* * * * *